Aug. 29, 1944.    S. C. LYONS ET AL    2,356,862

MECHANISM FOR EXTRUDING MOIST CLAY AND THE LIKE

Filed Jan. 24, 1942

Inventors
Sanford C. Lyons
David H. Young
by Wright, Brown, Quimby & May
Attys.

Patented Aug. 29, 1944

2,356,862

UNITED STATES PATENT OFFICE 2,356,862

MECHANISM FOR EXTRUDING MOIST CLAY AND THE LIKE

Sanford C. Lyons, Bennington, Vt., and David H. Young, Dry Branch, Ga., assignors to Georgia Kaolin Company, Elizabeth, N. J., a corporation of Georgia Application January 24, 1942, Serial No. 428,042

11 Claims. (Cl. 25—11)

This invention relates to extruding viscous plastic materials such as moist clay and the like. While apparatus embodying the invention may be used generally in pressing extrusive materials through apertures, the mechanism herein described and illustrated is more particularly designed and intended for use in extruding clay having a moisture content of from 35% to 25%.

White clay such as kaolin or china clay occurs in nature in particles of various sizes. For certain purposes such as use in papermaking, it is desirable to separate the finest of the particles from the others. Such separation is effected when the clay is in a thin aqueous slurry. After the separation, a considerable portion of the water is removed by means of a filter press, leaving the clay with a moisture content of about 35% to 25%. This moisture must be removed by evaporation. In commercial operation, such evaporation must be rapid and must be so controlled as to leave the residual 1% to 4%, and sometimes slightly more, of moisture uniformly distributed through the clay.

The drying process is hastened by forming the clay into masses which have a small, uniform, cross-sectional area and a large area of external surfaces, and by causing a draft of warm dry air to blow across such surfaces. Drying apparatus may include a conveyor belt of woven wire screen 8 feet wide, on which screen clay is deposited in the form of cylindrical rods about ¼ inch in diameter, or in ribbons having a thickness up to $\frac{1}{16}$ inch and a width of about ⅝ inch. Such rods or ribbons of moist clay may conveniently be extruded directly above the conveyor belt. As the rods or ribbons are extruded, short lengths break off by their own weight and accumulate irregularly on the belt to a depth depending on the rate of extrusion and on the rate of travel of the belt, such depth being preferably 3 to 4 inches.

It is an object of the present invention to provide improvements in the extruding mechanism so that the clay will be extruded at a uniform rate with little or no need of attention by an operator and with a minimum expenditure of power consistent with commercial rapidity of operation.

According to the invention, a double trough is mounted above the conveyor belt of the drier and extends across the width of the belt. This trough is suitably perforated for the extrusion of rods or ribbons of clay therethrough. Two rotors, one in each half of the double trough, push the clay through the perforations as hereinafter described.

For a more complete understanding of the invention, reference may be had to the following description of an embodiment thereof, and to the drawing of which Figure 1 is a plan view of mechanism embodying the invention.

Figure 1:
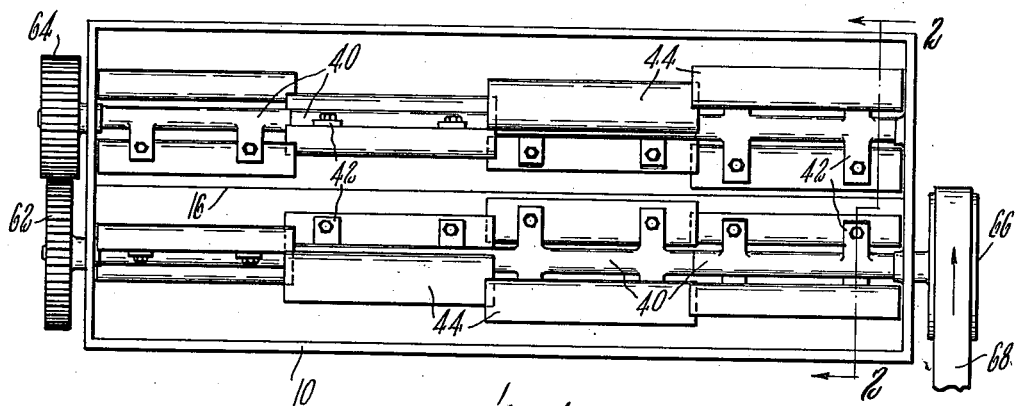
Figure 4:
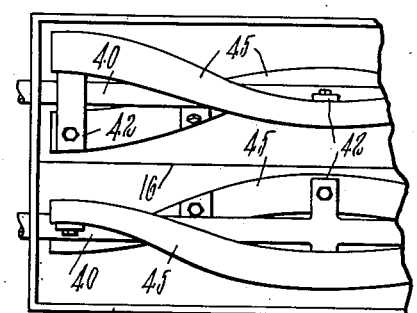
Figure 4 is a fragmentary plan view of a modified form of the invention.
Figure 3:
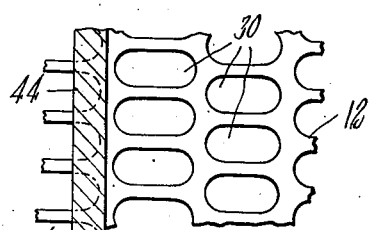
Figure 3 is a fragmentary section on the line 3—3 of Figure 2.

As shown, the invention may be embodied in a double trough 10 having two parallel cylindrical bottom portions 12 and 14 located side by side, merging into a central ridge 16 and into outwardly sloping external walls 18 and 20. These walls extend upward to a substantially higher level than the peak of the ridge 16. The latter is preferably a solid metal member suitably rabbetted as at 22 and 24 to receive the inner edges of the bottom portions 12 and 14 of the trough. The sides of the ridge piece above the rabbets are symmetrically beveled to meet on a sharply acute angle at approximately, and preferably slightly above, the level of the axes of the trough bottom portions. These bottom portions are perforated so as to serve as extruder plates for the extrusion of plastic material therethrough. Such perforations may be circular for the extrusion of cylindrical rods of plastic material, or may be elongated with parallel sides and circular ends as illustrated at 30 in Figure 3. Any desired size of perforations may be employed. For moist clay, the perforations illustrated in Figure 3 are preferably about ⅝ inch in length and $\frac{1}{16}$ inch in width. The perforations are preferably staggered as illustrated so that there is no continuous straight line of metal in any direction in the extruder plates 12 and 14. Above each extruder plate is a rotor, these rotors being mounted on shafts 32 and 34 which are coaxial with the respective plates. As the rotors are substantially similar to each other, a description of one will suffice for both. On the shaft 32 are keyed a series of units, each comprising a sleeve 40 having arms 42 extending radially therefrom in opposite directions. On the arms 42 are mounted propelling members or paddles 44 adapted to rub or press moist clay through the perforations 30. The paddles 44 of the several units on the shaft are angularly spaced from each other around the axis of the shaft and are adjustable toward and from the axis to adjust the clearance between the paddles and the bottom member 12. In the embodiment shown in Figure 1, four such units are illustrated, but a greater or lesser number can be employed as desired. The ends of the propelling members of adjacent units may overlap each other slightly so as to sweep the entire inner surface of the extruder plate 12 twice during each revolution of the shaft 32. Instead of the relatively short paddles shown in Figure 1, propelling members 45 extending the entire length of the trough may be employed, as in Figure 4. Furthermore, the paddles, long or short, may be straight and parallel with the axis of rotation, as in Figure 1, or may be helical after the manner of lawn-mower blades, as in Figure 4, the helices being coaxial with their respective shafts, and hence with the respective bottom plates 12 and 14.

Figure 2:
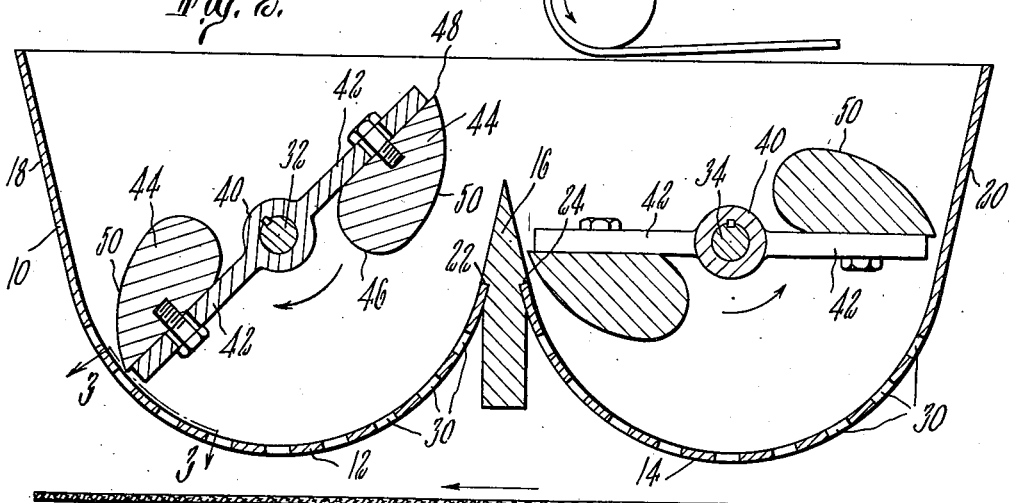
Figure 2 is a section on the line 2—2 of Figure 1.

The paddles or propelling members 44 are preferably substantial metal bars having a cross-sectional shape approximating a semi-cardioid as illustrated in Figure 2. The lobe 46 of each member is toward the axis of the shaft 32, the apex 48 being remote from the axis. The radial adjustment of each member 44 is preferably such that its apex 48 has a very slight clearance from the inner surface of the bottom of the trough. Each paddle member is mounted on the advancing side of the arms 42 by which it is carried, with its flat face against the arms and its convex face 50 in advance. Such face is formed to make a sharply acute angle at its outer extremity with the cylindrical trough bottom, and angles of progressively increasing magnitude away from the extremity. This convex surface thus flares away from the surface of the bottom of the trough and forms a contracting throat or nip between itself and the surface of the trough into which the clay may readily enter and by virtue of which the members 44, in their sweeping motion across the face of the bottom of the trough, exert a wedging action on the clay caught in this space so that the clay is pressed or rubbed through the perforations 30 during such sweeping motion.

Moist clay having a moisture content of from 35% to 25% exhibits characteristic behavior which makes it difficult to handle successfully under certain conditions. The present apparatus is designed to take such behavior into account and to maintain a steady extrusion of clay through the perforations 30. Clay is fed into the trough by any suitable means such as a conveyor belt 56. The lumps of clay deposited in the trough 10 tend to coalesce and arch over the revolving rotors, forming a blanket. Much difficulty has been encountered heretofore in attempts to overcome that tendency and cause the clay to be extruded in the desired manner. The clay is plastic and strongly adhesive to such an extent that a union similar to cohesion exists between adjoining particles. In the use of apparatus of the prior art, consisting of a single trough and a rotor therein, such a blanket frequently is formed and persists, rising and falling as the propelling members of the rotor travel along its under surface and preventing or seriously impeding passage of the clay to the extrusion orifices.

In the present invention, these effects and tendencies are overcome, not only by the provision of two extruded troughs side by side, but further by a special cooperative relationship between the rotors. The rotor shafts carry intermeshing gears 62 and 64, whereby when one is rotated the other is simultaneously rotated in the opposite direction, and means are provided, exemplified by the pulley 66 on shaft 32 and a driving belt 68 surrounding the pulley, for driving the rotors in the directions indicated by the arrows in Figures 1 and 2. In so rotating, the propelling members in the adjacent troughs move downwardly toward the central ridge when in operation, the paddle or propelling members being in advance, and such members in each trough approach the orbits of the members in the other troughs when so moving. Preferably also they are driven at slightly different speeds, the gears 62 and 64 having in in this instance a ratio of about 4 to 5. Consequently at times adjacent propelling members will approach the dividing ridge simultaneously and in approximately equal measure, and at other times they will approach the ridge more or less in alternation.

The shape of the advancing faces of the respective propelling members or paddles is also important and effective in the attainment of the desired results. When a mass of plastic clay becomes engaged between the cardioid-shaped advancing face of any propelling member and the semi-cylindrical extruder plate, it is acted on by two principal forces. One of these is the adhesive force between the clay and the face of the propeller, which tends to cause the clay mass to rotate with the propeller; and the other is a similar adhesive force causing the clay to stick to the extruder plate and to resist onward movement. By virtue of the formation and arrangement of the propeller members, a sufficient nip is provided between the face of each such member and the extruder plate so that a predominantly wedging action is immediately set up and only a minor rotational effect occurs. This results in the application of mainly radial force on the plastic mass which causes the clay to be extruded through the apertures. These effects are enhanced by the trough construction previously described, according to which there is a sharply acute dividing ridge between the troughs, the crest of which is near or above the plane of the trough axes. Tendency of the clay to adhere to the outer walls of the troughs is avoided by the outwardly flaring tangential arrangement of the parts 18 and 20 of such walls.

The radial adjustability of the propelling members or paddles is likewise important, as it enables their outer extremities or edges to be maintained in orbits which lie close to the inner surfaces of the respective troughs without actual contact with any points in such surfaces. This condition is thus maintained in spite of wear of the shafts and their bearings.

As shown in Figure 2, the trough 10 is preferably mounted above a conveyor belt 70 for a drier. Such conveyor belts are customarily made of woven wire so as to be open and pervious. In many driers now in use, the width of such belts is 8 feet. The trough 10 is consequently designed with a length of 8 feet so that it can span so much of the width of the conveyor belt 70 as will enable it to deposit on said belt an optimum quantity of clay to be dried. The extruded ribbons of clay break off by their own weight and fall in a tangled mass on the moving belt 70. These ribbon fragments of clay are then carried to drying mechanism (not shown) by which warm dried air is forced upward through the screen and wire thereon, and then another stream is forced downward through the wire and belt to ensure uniform drying.

It is evident that various modifications and changes may be made in the specific embodiment of the invention herein shown and described without departing from the spirit or scope thereof as defined in the following claims.

What we claim is:

1. Apparatus for extruding moist clay, comprising a double trough having a pair of perforated cylindrical bottom portions merging into a central longitudinal ridge, a rotor mounted above each said bottom portion coaxially therewith, each said rotor comprising a shaft and paddles or propelling members mounted to move along the surfaces of said bottom portions as the shafts revolve, and means rotating said shafts simultaneously at unequal speeds and in relatively opposite directions.

2. Apparatus for extruding moist clay, comprising a double trough having a pair of perforated cylindrical bottom portions merging into a central longitudinal ridge, a pair of rotors mounted in said trough and arranged coaxially with said bottom portions respectively, each said rotor including longitudinal members arranged to sweep said perforated bottom portions and having at the advancing side a surface which makes a sharply acute angle with the trough bottom at its outer extremity and progressively larger angles at points successively more remote from such extremity, and means for rotating said rotors.

3. Apparatus for extruding moist clay, comprising a double trough having a pair of perforated cylindrical bottom portions merging into a central longitudinal ridge, a pair of rotors mounted in said trough and arranged coaxially with said bottom portions respectively, each said rotor including longitudinal members having a cross-section approximating a semi-cardioid at the advance side with the apex arranged to pass close to the surface of the trough bottom and to form between its curved face and said bottom surface a flaring throat, and means for rotating said rotors.

4. Apparatus for extruding moist clay, comprising a trough having a cylindrical perforated bottom portion merging into outwardly sloping sides, a rotor mounted in said trough coaxially with said bottom portion, said rotor including a plurality of longitudinally extending members arranged to sweep the entire surface of said bottom portion, said members being each a fraction of the length of the trough and angularly spaced from each other about the axis of the rotor, and means for rotating said rotor.

5. Apparatus for extruding moist clay, comprising a double trough having a pair of perforated cylindrical bottom portions merging into a central longitudinal ridge, a pair of rotors coaxial respectively with said bottom portions, each said rotor having a plurality of longitudinal members each extending a fraction of the length of the trough and angularly spaced from one another about the rotor axis, said members together being arranged to sweep the entire inner surface of said bottom portions of the trough, and means for rotating said rotors simultaneously in relatively opposite directions.

6. Apparatus for extruding moist clay, comprising a double trough having a pair of perforated cylindrical bottom plates merging into a central longitudinal ridge, a pair of rotors above respective said bottom plates and coaxial therewith, each said rotor consisting of a plurality of units, each unit consisting of a hub, radial arms projecting from said hub in opposite directions, and propelling members mounted on said arms parallel to the axis of said rotor at respectively opposite sides of the hub, each said paddle member having a cross-sectional shape approximating a semi-cardioid with its apex remote from said axis and its convex lateral surface disposed to form with the adjacent trough bottom a flaring throat, and means for rotating said rotors simultaneously in relatively opposite directions and at different speeds.

7. Apparatus for extruding moist clay, comprising a double trough having a pair of perforated cylindrical bottom plates merging into a central longitudinal ridge, a pair of rotors mounted in said trough, each said rotor including longitudinal helical paddles arranged to sweep the perforated bottoms, the axis of each said cylindrical bottom plate being the same as the axis of rotation and the helix axis of the rotor therein.

8. Apparatus for extruding moist clay, comprising a double trough having a pair of perforated cylindrical bottom plates merging into a central longitudinal ridge, a pair of rotors above respective said bottom plates and coaxial therewith, each said rotor consisting of a plurality of units, each unit consisting of a hub, radial arms projecting from the hub in opposite directions, and a pair of paddle members mounted on said arms, each said paddle member being a segment of a helix which is coaxial with its axis of rotation, each said paddle member having a cross-sectional shape approximating a semi-cardioid with its apex remote from its axis of rotation and its convex lateral surface at the advancing side, and means for rotating said rotors simultaneously in relatively opposite directions.

9. Apparatus for extruding non-fluid plastic material, comprising two troughs having substantially semi-cylindrical perforated bottom portions located side by side with a sharply acute dividing ridge between them, propelling members mounted in the respective troughs to rotate about the axes of said troughs, and means for rotating said propelling members simultaneously in opposite directions adapted to rotate them in such directions that they travel downwardly in approaching said dividing ridge.

10. An apparatus of the character described, comprising two troughs having cylindrically curved perforated bottom portions mounted side by side with the axes of said portions substantially parallel to each other and an acute angle dividing ridge between them, the crest of which is in the neighborhood of the plane of said axes and the sides of which are substantially tangent to said cylindrical portions, rotors in said troughs each comprising a shaft rotatably mounted substantially coaxial with its respective trough, arms carried by the respective shafts and projecting substantially radially therefrom, propelling members carried by the respective arms, said members being adjustable on the arms so as to be placeable with their outer extremities in orbits which substantially coincide with the respective trough bottoms, and means for rotating said shafts simultaneously in relatively opposite directions.

11. An apparatus for extruding plastic clay, comprising two troughs having cylindrically curved perforated bottom portions located side by side with their axes substantially in parallel and having a dividing ridge between them, rotors mounted in the respective troughs to turn about the axes of said cylindrical portions, said rotors including propelling members located to travel in close proximity with the inner surfaces of said cylindrical bottom portions when rotated, and means for driving said rotors simultaneously in relatively opposite directions adapted to turn them in such directions that the propelling members move downwardly in approaching said ridge, the surfaces of said propelling members which are in advance when rotated in the aforesaid directions being of substantially semi-cardioid formation making sharply acute angles with their respective orbits at their outer extremities and progressively larger angles at successive locations inwardly from said extremities.

SANFORD C. LYONS.
DAVID H. YOUNG.